3,092,483
HERBICIDAL METHOD EMPLOYING 1-PHENYL-2,3-DIMETHYL-4-CHLORO - PYRAZOLONE AND SALTS THEREOF

Werner Perkow, Hamburg, Germany, assignor of one-half to Norddeutsche Affinerie, Hamburg, Germany, a corporation of Germany, and one-half to C. F. Spiess & Sohn, a partnership of Germany
No Drawing. Filed Feb. 27, 1961, Ser. No. 91,660
1 Claim. (Cl. 71—2.5)

This invention relates to a method of killing weeds, and more particularly relates to a method of eradicating noxious vegetation through the use of a phenyl substituted, chlorinated pyrazolone compound.

The present invention is based upon the discovery that the compound 1-phenyl-2,3-dimethyl - 4 - chloro-pyrazolone-(5) and salts thereof demonstrate an exceptionally high rate of herbicidal activity on a broad spectrum of both monocotyledonous and dicotyledonous plants, while simultaneously demonstrating a high degree of selectivity with respect to certain desirable plant crops. This discovery is highly surprising since tests using closely related pyrazolones, for example the 1-phenyl-3-methyl-4-chloro-pyrazolone-(5) and the 1-phenyl-3-methyl-4,4-dichloro-pyrazolone-(5) indicated a virtually complete lack of herbicidal activity for this class of compounds.

Preparation of the 1-phenyl-2,3-dimethyl-4-chloro-pyrazolone-(5) may best be accomplished by straight chlorination of antipyrine according to the following example:

100 parts of 1-phenyl-2,3-dimethyl pyrazolone-(5) (antipyrine) were dissolved in 400 parts of chloroform and, with cooling, a stream of dry chlorine gas was passed into the mixture until hydrogen chloride gas escaped from the reaction vessel. Chloroform was removed by stripping under vacuum and a residual oil layer was extracted with acetone to recover a crystalline product. Recrystallization was effected with acetone and yielded 80 parts of 1-phenyl-2,3-dimethyl-4-chloro-pyrazolone-(5)-hydrochloride having a melting point of 138–140° C. Treatment of the resulting hydrochloride salt with dilute solutions of sodium carbonate or bicarbonate yield the 1-phenyl-2,3-dimethyl-4-chloro-pyrazolone-(5) having a melting point of 128–130° C.

The 1-phenyl-2,3-dimethyl - 4 - chloro-pyrazolone-(5) readily forms salts with both inorganc and organic acids. For example, reaction of the pyrazolone with sulfuric acid yields a salt having a melting point of 105–107° C. Similarly, the reaction of the pyrazolone with acetic or propionic acids yields the corresponding salts. The reaction of 1-phenyl-2,3-dimethyl - 4 - chloro-pyrazolone-(5) with trichloroacetic acid yields a salt having a melting point of 79–81° C.

Both the basic pyrazolone and its mineral acid salts are freely soluble in water, thus lending themselves to simple solution in aqueous media for spray application. These same compounds are soluble to a lesser extent in agricultural oils and may be combined upon formulation with wetting or emulsifying agents. The lesser soluble organic salts may be formulated into wettable powders or admixed with pulverulent carriers such as vermiculite. Attaclay and talc for application as granules or dusts.

In order to demonstrate the high degree of herbicidal action exhibited by 1-phenyl-2,3-dimethyl-4-chloro-pyrazolone-(5) tnere are presented below various résumés of results obtained from both pre-emergent and post-emergent applications.

The results reported in Table I were obtained using an aqueous solution of the sulfate salt of 1-phenyl-2,3-dimethyl-4-chloro-pyrazolone-(5), and applying the solution on a pre-emergent basis in such amounts as to yield 16 lbs./ acre of the basic pyrazolone compound.

Table I

| Plant specie: | Herbicidal effect |
|---|---|
| Corn | No injury. |
| Cheat grass | Severe injury. |
| Foxtail | Moderate injury. |
| Crabgrass | Total kill. |
| Johnson grass | Severe injury. |
| Velvet leaf | Total kill. |
| Alfalfa | Do. |
| Curled dock | Severe injury. |
| Yellow rocket | Do. |
| Pigweed | Do. |
| Chickweed | Do. |
| Lamb's quarter | Total kill. |

The following results were obtained by applying various amounts of 1-phenyl-2,3-dimethyl-4-chloro-pyrazolone-(5) in the form of a hydrochloride salt on a pre-emergent basis to field plots of seeded corn, which plots were also seeded with various mixed monocotyledonous and dicotyledonous species.

Table II

| Lbs./Acre as 1-phenyl-2,3-dimethyl-4-chloro-pyrazolone-(5) | Corn | Plant type—Control obtained | |
|---|---|---|---|
| | | Monocotyledonous | Dicotyledonous |
| 12.5 | No injury | Severe injury | Severe injury. |
| 15 | do | do | Total kill. |
| 17.5 | do | do | Do. |

An aqueous solution of 1-phenyl-2,3-dimethyl-4-chloro-pyrazolone-(5) was applied to a field of growing crops infested with curled dock, velvet leaf and lamb's quarter at a rate sufficient to yield 12.5 lbs./acre of the pyrazolone compound. Results are recorded below in Table III.

Table III

| Plant specie: | Herbicidal effect |
|---|---|
| Corn | No injury. |
| Sugar beet | Do. |
| Spinach | Do. |
| Onions | Do. |
| Peas | No injury to very slight injury. |
| Wheat | Do. |
| Rye | Do. |
| Barley | Do. |
| Oats | Do. |
| Millet | Do. |
| Curled dock | Severe injury. |
| Lamb's quarter | Do. |
| Velvet leaf | Do. |

Post-emergent applications of the trichloroacetic acid salt of 1-phenyl-2,3-dimethyl - 4 - chloro-pyrazolone-(5)

compound were made to obtain rates of 4, 8 and 16 lbs./acre and were compared to similar applications of trichloroacetic acid at 4 and 8 lbs./acre. The results from these tests are recorded in Table IV.

*Table IV*

| Plant Specie | TCA-Pyrazolone salt, lbs./acre | | | Trichloroacetic acid, lbs./acre | |
|---|---|---|---|---|---|
| | 16 | 8 | 4 | 8 | 4 |
| Corn | 0 | 0 | 0 | --- | 2 |
| Crabgrass | 4 | 4 | 3+ | 3 | 2 |
| Johnson grass | 4 | 3 | 3 | 3 | 0 |
| Yellow Rocket | 4 | 4 | 4 | 2 | 2 |
| Chickweed | 4 | 4 | 4 | 2 | 2 |
| Lambs quarter | 4 | 4 | 4 | 4 | 0 |
| Curled dock | 4 | 4 | 4 | 4 | 0 |
| Velvet leaf | 4 | 4 | 4 | 3 | 2 |

Key: 0 = no injury; 2 = moderate injury; 3 = severe injury; 4 = total kill.

From the foregoing results it is evident that 1-phenyl-2,3-dimethyl-4-chloro-pyrazolone-(5) and its organic and inorganic salts demostarte not only a high degree of herbicidal action but also marked selectivity in favor of desirable crops when used in both pre and post-emergence treatments.

We claim:

The method for the control of weeds which comprises applying to the locus to be treated a herbicidally effective amount of a compound selected from the class consisting of 1-phenyl-2,3-dimethyl - 4 - chloro-pyrazolone-(5), 1-phenyl-2,3-dimethyl-4-chloro-pyrazolone-(5) hydrochloride, 1-phenyl-2,3-dimethyl - 4 - chloro-pyrazolone-(5) sulfate and 1-phenyl-2,3-dimethyl - 4 - chloro-pyrazolone-(5) trichloroacetate.

References Cited in the file of this patent

Thompson et al. in "Botanical Gazette," vol. 107, pages 475 to 507 (pages 480 and 492 particularly relied on).

Frear, "Catalogue of Insecticides and Fungicides," vol. 1, page 102 (1947).